(12) United States Patent
Fukushima et al.

(10) Patent No.: US 11,390,827 B2
(45) Date of Patent: *Jul. 19, 2022

(54) COMPOSITION FOR HEAT CYCLE SYSTEM, AND HEAT CYCLE SYSTEM

(71) Applicants: AGC Inc., Chiyoda-ku (JP); Japan Sun Oil Company, Ltd., Chiyoda-ku (JP)

(72) Inventors: Masato Fukushima, Chiyoda-ku (JP); Rei Saito, Chiyoda-ku (JP)

(73) Assignees: AGC Inc., Chiyoda-ku (JP); Japan Sun Oil Company, Ltd., Chiyoda-ku (JP)

( * ) Notice: Subject to any disclaimer, the term of this patent is extended or adjusted under 35 U.S.C. 154(b) by 219 days.

This patent is subject to a terminal disclaimer.

(21) Appl. No.: 16/571,385

(22) Filed: Sep. 16, 2019

(65) Prior Publication Data

US 2020/0010777 A1 Jan. 9, 2020

Related U.S. Application Data

(63) Continuation of application No. PCT/JP2018/010412, filed on Mar. 16, 2018.

(30) Foreign Application Priority Data

Mar. 17, 2017 (JP) .............................. JP2017-053587

(51) Int. Cl.
*C10M 171/00* (2006.01)
*C10M 101/02* (2006.01)
(Continued)

(52) U.S. Cl.
CPC ......... *C10M 171/008* (2013.01); *C09K 5/044* (2013.01); *C10M 101/02* (2013.01);
(Continued)

(58) Field of Classification Search
None
See application file for complete search history.

(56) References Cited

U.S. PATENT DOCUMENTS 10,253,276 B2 * 4/2019 Takahashi ............ C10M 101/02
2016/0178255 A1 * 6/2016 Nishiguchi ............ C09K 5/045
62/115
(Continued)

FOREIGN PATENT DOCUMENTS

JP 2012-31239 A 2/2012
JP 2016-121248 A 7/2016
(Continued)

OTHER PUBLICATIONS

International Search Report dated May 29, 2018 in PCT/JP2018/010412 filed Mar. 16, 2018 (with English Translation).

*Primary Examiner* — Joseph D Anthony
(74) *Attorney, Agent, or Firm* — Oblon, McClelland, Maier & Neustadt, L.L.P.

(57) ABSTRACT

To provide a composition for a heat cycle system with which a HCFO or a CFO can more stably lubricate, and a heat cycle system employing the composition. A composition for a heat cycle system comprising a working fluid for heat cycle containing at least one compound selected from predetermined HCFO and CFO, and a mixed refrigeration oil obtained by mixing a naphthenic mineral oil and other predetermined refrigeration oil, wherein the mixed refrigeration oil has a kinematic viscosity at 40° C. of 300 mm²/s or lower, a mixed composition 1 of the working fluid for heat cycle and the mixed refrigeration oil at a concentration of the working fluid for heat cycle of 10 mass % has a viscosity at 60° C. of 10 mPa·s or higher, and a mixed composition 2 of the working fluid for a heat cycle system and the mixed refrigeration oil at a concentration of the mixed refrigeration oil of 5 mass % has a two phase separation temperature of (Continued)

0° C. or lower, and a heat cycle system, which employs the composition for a heat cycle system.

13 Claims, 1 Drawing Sheet

(51) Int. Cl.
  *C09K 5/04* (2006.01)
  *C10M 169/04* (2006.01)
  *C10N 20/00* (2006.01)
  *C10N 30/02* (2006.01)
  *C10N 40/30* (2006.01)

(52) U.S. Cl.
  CPC ..... *C10M 169/04* (2013.01); *C09K 2205/126* (2013.01); *C10M 2203/065* (2013.01); *C10M 2203/106* (2013.01); *C10N 2020/099* (2020.05); *C10N 2030/02* (2013.01); *C10N 2040/30* (2013.01)

(56) References Cited

U.S. PATENT DOCUMENTS

| | | |
|---|---|---|
| 2017/0044461 A1 | 2/2017 | Takahashi et al. |
| 2017/0044462 A1 | 2/2017 | Takahashi et al. |
| 2018/0044567 A1* | 2/2018 | Tasaka .................. F25B 1/053 |
| 2018/0066170 A1* | 3/2018 | Tasaka .............. C10M 171/008 |
| 2019/0161701 A1* | 5/2019 | Shono ................. C10M 129/18 |
| 2021/0054301 A1* | 2/2021 | Shono ................. C10M 101/00 |

FOREIGN PATENT DOCUMENTS

| | | |
|---|---|---|
| WO | WO 2012/157763 A1 | 11/2012 |
| WO | WO 2015/163071 A1 | 10/2015 |
| WO | WO 2015/163072 A1 | 10/2015 |
| WO | WO 2015/182173 A1 | 12/2015 |
| WO | WO 2016/171256 A1 | 10/2016 |
| WO | WO 2016/171264 A1 | 10/2016 |
| WO | WO 2017/145895 A1 | 8/2017 |
| WO | WO 2017/145896 A1 | 8/2017 |

* cited by examiner

COMPOSITION FOR HEAT CYCLE SYSTEM, AND HEAT CYCLE SYSTEM

STATEMENT REGARDING JOINT RESEARCH AGREEMENT

Aspects of the present invention were made under a Joint Research Agreement naming AGC Inc. and Japan Sun Oil Co., Ltd., both of Chiyoda-ku Japan, as parties.

This application is a continuation of PCT Application No. PCT/JP2018/010412, filed on Mar. 16, 2018, which is based upon and claims the benefit of priority from Japanese Patent Application No. 2017-053587 filed on Mar. 17, 2017. The contents of those applications are incorporated herein by reference in their entireties.

TECHNICAL FIELD

The present invention relates to a composition for a heat cycle system, and a heat cycle system employing the composition.

BACKGROUND ART

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for a heat cycle system, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture of HFC-32 and HFC-125 in a mass ratio of 1:1) is a refrigerant which has been widely used. However, it is pointed out that HFCs may cause global warming.

For example, 1,1,1,2-tetrafluoroethane (HFC-134a) used as a refrigerant for an automobile air conditioning apparatus has a global warming potential so high as 1,430 (100 years). Further, in an automobile air conditioning apparatus, the refrigerant is highly likely to leak out to the air e.g. from a connection hose or a bearing.

As a refrigerant which replaces HFC-134a, carbon dioxide and 1,1-difluoroethane (HFC-152a) having a global warming potential of 124 (100 years) which is low as compared with HFC-134a, have been studied.

However, with carbon dioxide, the equipment pressure tends to be extremely high as compared with HFC-134a, and accordingly there are many problems to be solved in application to all the automobiles. HFC-152a has a range of inflammability, and has a problem for securing the safety.

Further, HFC-134a is used also as a working fluid for a centrifugal refrigerator (also called a turbo refrigerator). A centrifugal refrigerator is used for heating and cooling in buildings, industrial cold water production plants, etc. As a working fluid for a centrifugal refrigerator, a chlorofluorocarbon such as CFC-11 has been used, however, production and use of chlorofluorocarbons have been internationally regulated due to problem of ozone depletion in recent years. Thus, hydrogen-containing fluorocarbon working fluids containing no chlorine, such as tetrafluoroethane (HFC-134a) and pentafluoropropane (HFC-245fa) have been used instead.

Here, HFC-134a has a global warming potential so high as 1,430 (100 years). Further, HFC-245fa has a global warming potential of 1,030 (100 years) but has high toxicity. In a centrifugal refrigerator, the working fluid filling amount is large as compared with other refrigerator and heat pump. For example, into a centrifugal refrigerator of a class of 500 ton of refrigeration, from about 700 to 800 kg of a working fluid is loaded. A centrifugal refrigerator is fixed in a machine room of a building in many cases and if leakage of the working fluid occurs e.g. by an accident, the working fluid may be discharged in a large amount to the air. Thus, a working fluid to be used for a centrifugal refrigerator is required to have not only a low global warming potential in the environmental viewpoint but also high safety, i.e. low toxicity and low flammability.

In recent years, a compound having a carbon-carbon double bond, such as a hydrofluoroolefin (HFO), a hydrochlorofluoroolefin (HCFO) and a chlorofluoroolefin (CFO) is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

Among the above HFO, HCFO and CFO having a carbon-carbon double bond, the HCFO and the CFO are compound having flammability suppressed since the proportion of halogen in one molecule is high. Accordingly, as a working fluid having less influence over the ozone layer and having less influence over global warming and further having flammability suppressed, use of HCFOs or CFOs has been studied. As such a working fluid, 1-chloro-2,3,3,3-tetrafluoropropene (hereinafter referred to as "HCFO-1224yd") (for example, Patent Document 1) which is a hydrochlorofluoropropene has been known.

With respect to a composition for a heat cycle system, it is common to mix a working fluid and a refrigeration oil to obtain a composition for a heat cycle system. However, it is difficult to adjust the compatibility of a working fluid containing a chlorine atom such as a HCFO or a CFO with the refrigeration oil and to adjust e.g. the dissolved viscosity of a mixture of the working fluid and the refrigeration oil to be within a predetermined range. For example, since the viscosity of the refrigeration oil is remarkably decreased when the stopped state of the heat cycle system is turned into the start-up state, a composition for a heat cycle system which can maintain appropriate lubricity at the time of start-up is required. However, as for a practical combination of the working fluid with a refrigeration oil, only some specific combinations have been known.

Thus, a method for smoothly operating a heat cycle system employing e.g. a HCFO or a CFO as a working fluid stably for a long period of time, with maintained lubricity while excellent cycle performance of the HCFO or the CFO is sufficiently made use of, has been desired.

In this specification, abbreviated names of halogenated hydrocarbon compounds are described in brackets after the compound names, and in this specification, the abbreviated names are employed instead of the compound names as the case requires.

PRIOR ART DOCUMENTS

Patent Documents

Patent Document 1: WO2012/157763

DISCLOSURE OF INVENTION

Technical Problem

The present invention has been made under these circumstances, and its object is to provide a composition for a heat cycle system comprising a HCFO or a CFO, excellent in the stability and lubricity, while the low global warming potential and excellent cycle performance of the HCFO or CFO are sufficiently made use of, and a heat cycle system employing the composition, which has less influence over global warming and has high cycle performance, and which is excellent in the stability.

Solution to Problem

The present invention provides a working fluid for heat cycle, a composition for a heat cycle system, and a heat cycle system, having the following constitutions [1] to [13].
[1] A composition for a heat cycle system, comprising:
  a working fluid for heat cycle containing at least one compound selected from a hydrochlorofluoroolefin and a chlorofluoroolefin represented by the following formula (a), and
  a mixed refrigeration oil containing a naphthenic mineral oil and at least one refrigeration oil selected from a paraffinic mineral oil, an alkylbenzene, an olefin polymer, a polyol ester refrigeration oil, a polyvinyl ether refrigeration oil and a polyalkylene glycol refrigeration oil,
  wherein the mixed refrigeration oil has a kinematic viscosity at 40° C. of 300 mm²/sec or lower,
  a mixture (mixed composition 1) of the working fluid for heat cycle and the mixed refrigeration oil at a concentration of the working fluid for heat cycle of 10 mass % has a viscosity at 60° C. of 10.5 mPa·s or higher, and
  a mixture (mixed composition 2) of the working fluid for heat cycle and the mixed refrigeration oil at a concentration of the mixed refrigeration oil of 5 mass % has a two phase separation temperature of 0° C. or lower:

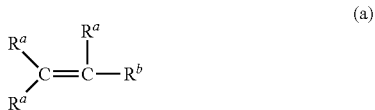

(a)

wherein $R^a$ is each independently a fluorine atom, a chlorine atom or a hydrogen atom, $R^b$ is $(CR^a{}_2)_n Y$, Y is $CF_3$, n is 0 or 1, and at least one $R^a$ is a chlorine atom.
[2] The composition for a heat cycle system according to [1], wherein the mixed refrigeration oil contains a naphthenic mineral oil and at least one member selected from a paraffinic mineral oil, an olefin polymer and a polyol ester refrigeration oil.
[3] The composition for a heat cycle system according to [1] or [2] wherein the content of the working fluid for heat cycle is from 40 to 95 mass % based on the entire amount of the composition for a heat cycle system.
[4] The composition for a heat cycle system according to any one of [1] to [3], wherein the content of the mixed refrigeration oil is from 5 to 60 mass % based on the entire amount of the composition for a heat cycle system.
[5] The composition for a heat cycle system according to any one of [1] to [4], wherein the content of the naphthenic mineral oil is from 50 to 90 mass % based on the entire amount of the mixed refrigeration oil.
[6] The composition for a heat cycle system according to any one of [1] to [5], wherein the working fluid for heat cycle contains 1-chloro-2,3,3,3-tetrafluoropropene.
[7] The composition for a heat cycle system according to [6], wherein in the 1-chloro-2,3,3,3-tetrafluoropropene, the ratio of (Z)-1-chloro-2,3,3,3-tetrafluoropropene to (E)-1-chloro-2,3,3,3-tetrafluoropropene is, by the mass ratio represented by (Z)-1-chloro-2,3,3,3-tetrafluoropropene: (E)-1-chloro-2,3,3,3-tetrafluoropropene, from 51:49 to 100:0.
[8] The composition for a heat cycle system according to [6] or [7], wherein the content of 1-chloro-2,3,3,3-tetrafluoropropene is 10 mass % or higher per 100 mass % of the working fluid for heat cycle.
[9] The composition for a heat cycle system according to any one of [6] to [8], wherein the content of 1-chloro-2,3,3,3-tetrafluoropropene is from 20 to 95 mass % per 100 mass % of the working fluid for heat cycle.
[10] A heat cycle system, which employs the composition for a heat cycle system as defined in any one of [1] to [9].
[11] The heat cycle system according to [10], which is a refrigerating apparatus, an air-conditioning apparatus, a power generation system, a heat transport apparatus or a secondary cooling machine.
[12] The heat cycle system according to [10], which is a centrifugal refrigerator. [13] The heat cycle system according to [10], which is a low pressure centrifugal refrigerator.

Advantageous Effects of Invention

According to the present invention, it is possible to provide a composition for a heat cycle system, excellent in the stability and lubricity, while the low global warming potential and excellent cycle performance of the HCFO or CFO are sufficiently made use of.

The heat cycle system of the present invention is a heat cycle system which has less influence over global warming and has high cycle performance, and in which the lubricating properties of the working fluid for heat cycle are improved.

DESCRIPTION OF EMBODIMENTS

Figure 1:
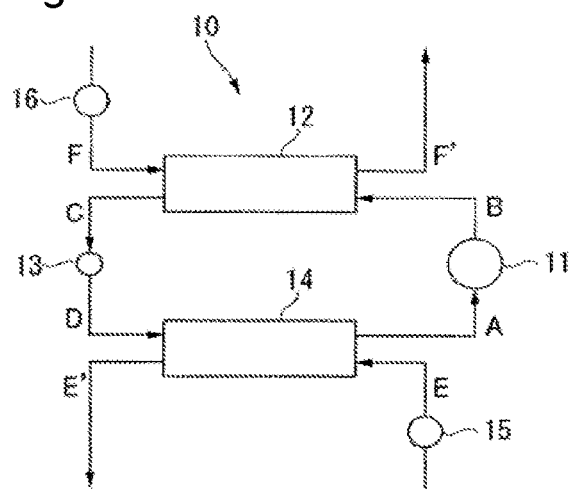
FIG. 1 is a schematic construction view illustrating a refrigeration cycle system as an embodiment of a heat cycle system of the present invention.

Now, the composition for a heat cycle system and the heat cycle system of the present invention will be described in detail.
[Composition for Heat Cycle System]
The composition for a heat cycle system according to the present embodiment comprises a working fluid for heat cycle containing at least one compound selected from a HCFO and a CFO, and a mixed refrigeration oil containing a naphthenic mineral oil and at least one refrigeration oil selected from a paraffinic mineral oil, an alkylbenzene, an olefin polymer, a polyol ester refrigeration oil, a polyvinyl ether refrigeration oil and a polyalkylene glycol refrigeration oil.

As a heat cycle system to which the composition for a heat cycle system according to the present embodiment is applied, a heat cycle system by a heat exchanger such as a condenser or an evaporator may be used without any particular restriction. The heat cycle system, for example, a refrigeration cycle system, has a mechanism in which a gaseous working fluid is compressed by a compressor and cooled by a condenser to form a high pressure liquid, the pressure of the liquid is lowered by an expansion valve, and the liquid is vaporized at low temperature by an evaporator so that heat is removed by the heat of vaporization.

In order to use the HCFO or the CFO as a working fluid for such a heat cycle system, it is required to adjust the viscosity of the composition for a heat cycle system containing the HCFO or the CFO to a sufficiently lubricating level by the conditions of use of the apparatus. However, such a working fluid containing fluorine atoms tends to be hardly soluble in a mineral refrigeration oil, and it is difficult to adjust the viscosity of a composition for a heat cycle system employing such a working fluid to a practical viscosity in many cases.

For the composition for a heat cycle system according to the present embodiment, as described hereinafter, by mixing with a specific refrigeration oil, lubricating properties of the HCFO or the CFO as the working fluid for heat cycle are optimized, whereby efficient cycle performance can be obtained.

With respect to the composition for a heat cycle system, mixed compositions obtained by mixing the working fluid and the mixed refrigeration oil constituting the composition for a heat cycle system in predetermined proportions satisfy the following two conditions. By satisfying such conditions, the composition has suitable properties as a composition for a heat cycle system and can smoothly operate a heat cycle system stably over a long period of time.

(1) A mixture (mixed composition 1) obtained by adding the working fluid to the mixed refrigeration oil at a concentration of the working fluid of 10 mass % has a viscosity at 60° C. of 10.5 mPa·s or higher, preferably from 10.5 to 15.0 mPa·s.

By such viscosity properties, the lubricating properties of the composition for a heat cycle system at the time of operation of the heat cycle system can be evaluated. That is, when the mixed composition 1 has a kinematic viscosity of 10.5 mPa·s or higher, when a composition for a heat cycle system is constituted by such a combination and the composition for a heat cycle system is circulated in a heat cycle system, the viscosity particularly at the time of start-up is improved, and the composition can be smoothly circulated with a viscosity appropriate for circulation.

(2) A mixture (mixed composition 2) obtained by adding the mixed refrigeration oil to the working fluid at a concentration of the mixed refrigeration oil of 5 mass % has a two phase separation temperature of 0° C. or lower, preferably −10° C. or lower. The two phase separation temperature may be measured in accordance with JIS K 2211.

By such dissolution properties, the lubricating properties of the refrigeration oil of the composition for a heat cycle system at the time of operation of the heat cycle system can be evaluated. That is, when the two phase separation temperature of the mixed composition 2 is 0° C. or lower, particularly the refrigeration oil will not be separated and omitted in the middle of the circulation flow path when the composition for a heat cycle system is circulated in the heat cycle system, and the stability of the composition for a heat cycle system can be secured.

Now, components contained in the composition for a heat cycle system according to the present embodiment will be described below.

<Working Fluid for Heat Cycle>

The composition for a heat cycle system according to the present embodiment comprises, as a working fluid for heat cycle (hereinafter sometimes referred to simply as "working fluid"), at least one compound selected from a hydrochlorofluoroolefin (HCFO) constituted by hydrogen atoms, carbon atoms, fluorine atoms and chlorine atoms and having a carbon-carbon double bond, and a chlorofluoroolefin (CFO) constituted by carbon atoms, fluorine atoms and chlorine atoms and having a carbon-carbon double bond.

Such a working fluid, which has in its molecule halogen which suppresses flammability and a carbon-carbon double bond which is easily decomposed by OH radicals in the air, is a working fluid for heat cycle which has flammability suppressed, which has less influence over the ozone layer and which has less influence over global warming.

The working fluid is preferably a working fluid containing at least one compound selected from a HCFO and a CFO represented by the following formula (a):

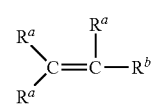

wherein $R^a$ is each independently a fluorine atom, a chlorine atom or a hydrogen atom, $R^b$ is $(CR^a_2)_n Y$, Y is $CF_3$, n is 0 or 1, and at least one $R^a$ is a chlorine atom.

In the formula (a), at least one $R^a$ bonded to the carbon atom in the carbon-carbon double bond is preferably a fluorine atom or a chlorine atom.

The compound represented by the formula (a) may have two isomers i.e. E form and Z form depending upon the structure. In this specification, the compound for which geometrical isomers are present and which is not represented by (E), (Z) or the like, is any one of E form, Z form and a mixture of E form and Z form at an optional proportion.

The content of the working fluid is preferably from 40 to 95 mass %, more preferably from 50 to 90 mass % based on the entire amount of the composition for a heat cycle system.

The HCFO may, for example, be 1-chloro-2,2-difluoroethylene (HCFO-1122), 1,2-dichlorofluoroethylene (HCFO-1121), 1-chloro-2-fluoroethylene (HCFO-1131), 1-chloro-2,3,3,3-tetrafluoropropene (HCFO-1224yd), 2-chloro-3,3,3-trifluoropropene (HCFO-1233xf) or 1-chloro-3,3,3-tetrafluoropropene (HCFO-1233zd).

Particularly, in view of a high critical temperature and excellent durability and coefficient of performance, HCFO-1224yd or HCFO-1233zd is preferred, and HCFO-1224yd is more preferred. Such HCFO may be used alone or in combination of two or more.

The CFO may, for example, be chlorofluoropropene or chlorofluoroethylene. With a view to suppressing flammability of the working fluid without significantly decreasing the cycle performance of the working fluid, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

Each of the HCFO and the CFO may be used alone, or working fluids of the same type may be combined, or working fluids of different types may be combined.

The total content of at least one compound selected from the HCFO and the CFO is preferably 10 mass % or higher, more preferably from 20 to 100 mass %, further preferably from 20 to 95 mass %, particularly preferably from 40 to 95 mass %, most preferably from 60 to 95 mass %, per 100 mass % of the working fluid. When it is at least the lower limit value, such a working fluid has less influence over global warming and is excellent in the cycle performance.

Now, a case where HCFO-1224yd is used as the working fluid will be described below as an example.

First, the content of HCFO-1224yd is preferably 10 mass % or higher, more preferably from 20 to 100 mass %, further preferably from 20 to 95 mass %, particularly preferably from 40 to 95 mass %, most preferably from 60 to 95 mass %, per 100 mass % of the working fluid.

HCFO-1224yd has two geometrical isomers of E form (HCFO-1224yd (E)) and Z form (HCFO-1224yd (Z)). HCFO-1224yd (Z) has higher chemical stability than HCFO-1224yd (E) and is preferred as the working fluid for heat cycle. Accordingly, the ratio of the isomers for HCFO-1224yd is, by the mass ratio represented by HCFO-1224yd (Z):HCFO-1224yd (E), preferably from 51:49 to 100:0, more preferably from 80:20 to 90:10. When the isomer ratio is at least the lower limit value of the above range, since a large amount of HCFO-1224yd (Z) is contained as HCFO-1224yd, whereby a composition for a heat cycle system which is stable for a longer period of time can be obtained. Further, when the isomer ratio is at most the upper limit value of the above range, an increase of the production cost e.g. by distillation separation of Z form and E form of HCFO-1224yd can be suppressed.

Properties of HCFO-1224yd as a working fluid are shown in Table 1 in terms of relative comparison with HFC-245fa and HFC-134a. The cycle performance is represented by the coefficient of performance and the refrigerating capacity obtained by the after-mentioned method. The coefficient of performance and the refrigerating capacity of HCFO-1224yd are represented by relative values based on HFC-245fa (1.000) (hereinafter referred to as relative coefficient of performance and relative refrigerating capacity). The global warming potential (GWP) is a value (100 years) in Intergovernmental Panel on Climate Change (IPCC), Fourth assessment report (2007), or a value measured in accordance therewith. In this specification, GWP is such a value unless otherwise specified.

TABLE 1

|  | HFC-245fa | HFC-134a | HCFO-1224yd |
|---|---|---|---|
| Relative coefficient of performance | 1.000 | 0.939 | 0.997 |
| Relative refrigerating capacity | 1.000 | 4.124 | 1.473 |
| GWP | 1030 | 1430 | At most 10 |

And, as described above, a working fluid other than HCFO-1224yd may be contained. The compound to be contained may be a HCFO other than HCFO-1224yd or a CFO.

In a case where a HCFO other than HCFO-1224yd is contained, its content is preferably from 1 to 90 mass %, more preferably from 1 to 40 mass % in the working fluid (100 mass %).

In a case where the working fluid contains the CFO, its content is less than 10 mass %, preferably from 1 to 8 mass %, more preferably from 2 to 5 mass % per 100 mass % of the working fluid. When the content of the CFO is over the lower limit value, the flammability of the working fluid tends to be suppressed. When the content of the CFO is under the upper limit value, favorable cycle performance is likely to be obtained.

GWPs of the above HCFO and CFO are an order of magnitude lower than the HFC. Accordingly, such working fluids are properly selected with a view to improving the cycle performance as the working fluid and maintaining the temperature glide within an appropriate range, without particularly considering GWP. Further, also when such working fluids are used as mixed, the working fluid to be combined may be properly selected from the same viewpoint.

(Temperature Glide)

In a case where the working fluid is a mixture of a plurality of working fluids, it has a considerable temperature glide except for a case of an azeotropic composition. The temperature glide of the working fluid varies depending upon the type of the components mixed and the mixture ratio.

In a case where a mixture is used as the working fluid, it is usually preferably an azeotropic mixture or a near-azeotropic mixture such as R410A. A non-azeotropic composition has a problem such that when it is put into a refrigeration and an air-conditioning equipment from a pressure container, it undergoes a composition change. Further, if a refrigerant leaks out from a refrigeration and an air-conditioning equipment, the composition of the working fluid composition in the refrigeration and the air-conditioning equipment is very likely to change, and a recovery of the working fluid composition to an initial refrigerant stage is difficult. Such problems can be avoided with an azeotropic or near-azeotropic mixture.

As an index to the applicability of a mixture as the working fluid, the "temperature glide" is commonly employed. The temperature glide is defined as properties such that the initiation temperature and the completion temperature of evaporation in an evaporator or of condensation in a condenser, for example, as the heat exchanger, differ from each other. The temperature glide of an azeotropic mixture is 0, and the temperature glide of a near-azeotropic mixture is extremely close to 0, for example, the temperature glide of R410A is 0.2.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature difference of the heat source fluid is small in a stable operation state, it is difficult to obtain a heat cycle system with a good energy efficiency with a non-azeotropic mixture fluid with a large temperature glide. Accordingly, when a mixture is used as a working fluid, a working fluid with an appropriate temperature glide is desired.

The working fluid used in the present embodiment may optionally contain a compound commonly used for a working fluid, in addition to the above HCFO and CFO, within a range not to impair the effects of the present invention. Such an optional compound (optional component) may, for example, be a HFC, a HFO, or another component which is vaporized and liquefied together with the HCFO or CFO.

A HFC is a component which improves the cycle performance (capacity) of the heat cycle system. The HFC is known to have a higher GWP as compared with the HCFO and the CFO. Accordingly, the HFC to be used in combination with the HCFO and the CFO is preferably selected properly particularly with a view to maintaining GWP within an acceptable range, in addition to improving the cycle performance as the working fluid and maintaining the temperature glide within an appropriate range.

As a HFC which has less influence over the ozone layer and which has less influence over global warming, specifically, a HFC having from 1 to 5 carbon atoms is preferred. The HFC may be linear, branched or cyclic.

The HFC may, for example, be difluoromethane, difluoroethane, trifluoroethane, tetrafluoroethane, pentafluoroethane, pentafluoropropane, hexafluoropropane, heptafluoropropane, pentafluorobutane or heptafluorocyclopentane.

Among them, more preferred is 1,1,2,2-tetrafluoroethane (HFC-134), 1,1,1,2-tetrafluoroethane (HFC-134a), 1,1,1,3,3-pentafluoropropane (HFC-245fa) or 1,1,1,3,3-pentafluorobutane (HFC-365mfc), which has less influence over the ozone layer and which has less influence over global warming, and more preferred is HFC-134a, HFC-245fa or HFC-365mfc.

The HFC may be used alone or in combination of two or more.

The content of the HFC in the working fluid (100 mass %) is, for example, as follows. In a case where the HFC is HFC-134a, it is possible to improve the refrigerating capacity without a significant decrease in the coefficient of performance, within a range of from 1 to 90 mass %. In the case of HFC-245fa, it is possible to improve the refrigerating capacity without a significant decrease in the coefficient of performance, within a range of from 1 to 60 mass %. It is possible to control the HFC content depending upon the required properties of the working fluid.

A HFO is a component which improves the cycle performance (capacity) of the heat cycle system.

GWP of the HFO is an order of magnitude lower than the HFC. Accordingly, the HFO to be used in combination with HCFO-1224yd is preferably selected properly particularly with a view to improving the cycle performance as the working fluid and maintaining the temperature glide within an appropriate range, rather than considering GWP.

The HFO may, for example, be difluoroethylene, trifluoroethylene, trifluoropropylene, tetrafluoropropylene, pentafluoropropylene or hexafluorobutene. Particularly, in view of less influence over the ozone layer and less influence over global warming, preferred is 1,1-difluoroethylene (HFO-1132a), 1,2-difluoroethylene (HFO-1132), 1,1,2-trifluoroethylene (HFO-1123), 2,3,3,3-tetrafluoropropene (HFO-1234yf), 2-fluoropropene (HFO-1261yf), 1,1,2-trifluoropropene (HFO-1243yc), (E)-1,2,3,3,3-pentafluoropropene (HFO-1225ye (E)), (Z)-1,2,3,3,3-pentafluoropropene (HFO-1225ye (Z)), (E)-1,3,3,3-tetrafluoropropene (HFO-1234ze (E)), (Z)-1,3,3,3-tetrafluoropropene (HFO-1234ze (Z)), 3,3,3-trifluoropropene (HFO-1243zf), (E)-1,1,1,4,4,4-hexafluoro-2-butene (HFO-1336mzz (E)) or (Z)-1,1,1,4,4,4-hexafluoro-2-butene (HFO-1336mzz (Z)), and more preferred is HFO-1234yf, HFO-1234ze (E), HFO-1234ze (Z) or HFO-1336mzz (Z).

The HFO may be used alone or in combination of two or more.

The content of the HFO is preferably from 1 to 90 mass %, more preferably from 1 to 40 mass % in the working fluid (100 mass %). When the content of the HFO is from 1 to 40 mass %, a heat cycle system excellent in the cycle performance (efficiency and capacity) is obtained as compared with a single use of a HCFO or a CFO as the working fluid.

(Other Optional Component)

The working fluid to be used for the composition for a heat cycle system according to the present embodiment may contain, other than the above optional component, carbon dioxide, a hydrocarbon, or the like. Such other optional component is preferably a component which has less influence over the ozone layer and which has less influence over global warming.

The hydrocarbon may, for example, be propane, propylene, cyclopropane, butane, isobutane, pentane or isopentane. The hydrocarbon may be used alone or in combination of two or more.

In a case where the working fluid contains a hydrocarbon, its content is less than 10 mass %, preferably from 1 to 5 mass %, more preferably from 3 to 5 mass % per 100 mass % of the working fluid. When the content of the hydrocarbon is over the lower limit value, the solubility of a mineral refrigeration oil in the working fluid will be more favorable.

The optional component is preferably a compound which can keep GWP and the temperature glide within acceptable ranges while having an effect to further improving the relative coefficient of performance and the relative refrigerating capacity, when used for heat cycle in combination with the HCFO or CFO. When the working fluid contains such a compound in combination with the HCFO or CFO, more favorable cycle performance can be obtained while keeping GWP low, and the influence by the temperature glide is small.

In a case where the working fluid to be used for the composition for a heat cycle system according to the present embodiment contains the above other optional component, the total content of such optional components in the working fluid is preferably less than 10 mass %, more preferably 8 mass % or lower, further preferably 5 mass % or lower per 100 mass % of the working fluid.

<Mixed Refrigeration Oil>

The composition for a heat cycle system according to the present embodiment comprises, in addition to the above working fluid, a mixed refrigeration oil which can improve lubricating properties of the working fluid. The mixed refrigeration oil used in the present embodiment is a mixed refrigeration oil containing a naphthenic mineral oil which is a mineral refrigeration oil as an essential component and further having other mineral refrigeration oil or a synthetic refrigeration oil mixed.

The mixed refrigeration oil is required to circulate in the heat cycle system together with the working fluid. The mixed refrigeration oil is soluble with the working fluid in the most preferred embodiment, however, so long as a mixed refrigeration oil which can circulate in the heat cycle system with the working fluid is selected, the mixed refrigeration oil having low solubility may be used as the refrigeration oil in the present embodiment. In order that the mixed refrigeration oil circulates in the heat cycle system, the mixed refrigeration oil is required to have a low kinematic viscosity, and in the present invention, the kinematic viscosity of the mixed refrigeration oil at 40° C. is 300 mm$^2$/s or lower, preferably from 1 to 200 mm$^2$/s, particularly preferably from 1 to 150 mm$^2$/s.

Such a mixed refrigeration oil is used as the composition for a heat cycle system as mixed with the working fluid, and the content of the mixed refrigeration oil is preferably from 5 to 60 mass %, more preferably from 10 to 50 mass % based on the entire amount of the composition for a heat cycle system.

Now, the respective refrigeration oils constituting the mixed refrigeration oil in the present embodiment will be described below.

[Naphthenic Mineral Oil]

The naphthenic mineral oil is a mineral oil containing a cyclic saturated hydrocarbon (naphthenic ring) component in a large amount, and is particularly excellent in electrical insulating properties, low moisture absorbing properties, hydrolysis resistance, lubricity, solubility of impurities such as a process oil, oil returning properties, etc. as compared with other mineral oils, and is used as a base oil to be the base in the present embodiment.

In order that such properties more favorably develop, the density of the naphthenic mineral oil at 15° C. is preferably 0.89 g/cm$^3$ or higher, more preferably 0.90 g/cm$^3$ or higher. If the density is less than 0.89 g/cm$^3$, the naphthenic mineral oil tends to be inferior in the lubricity and the oil returning properties.

Further, the naphthenic mineral oil has an aniline point of 95° C. or lower, more preferably 88° C. or lower, in order to improve the solubility of impurities. The naphthenic mineral oil has high compatibility with the working fluid comprising the HCFO or the CFO.

The naphthenic mineral oil may, for example, be obtained by refining a lubricating oil fraction obtained by atmospheric distillation or vacuum distillation of naphthenic crude oil by a treatment such as solvent deasphalting, solvent extraction, hydrocracking, solvent dewaxing, catalytic dewaxing, hydrotreating and clay treatment optionally in combination.

Since the mixed refrigeration oil is required to have the above kinematic viscosity, the kinematic viscosity of the naphthenic mineral oil used at 40° C. is also preferably from 1 to 300 mm$^2$/s, particularly preferably from 1 to 150 mm$^2$/s.

The content of the naphthenic mineral oil in the mixed refrigeration oil is preferably from 50 to 90 mass %, more preferably from 60 to 80 mass % based on the entire amount of the refrigeration oil.

By the mixed refrigeration oil containing the naphthenic mineral oil in an amount of 50 mass % or higher, the compatibility of the mixed refrigeration oil with the working fluid tends to be good, and by the mixed refrigeration oil containing the naphthenic mineral oil in an amount of 90 or lower mass %, the viscosity properties of the mixed refrigeration oil can be improved.

[Other Mineral Refrigeration Oil]

The mineral refrigeration oil may be a mineral refrigeration oil other than the naphthenic mineral oil, for example, a paraffinic mineral oil.

The paraffinic mineral oil is a mineral oil containing a chain saturated hydrocarbon (saturated aliphatic chain) component in a large amount, obtained by refining a lubricating oil component obtained by atmospheric distillation or vacuum distillation of paraffinic crude oil by a treatment such as solvent deasphalting, solvent extraction, hydrocracking, solvent dewaxing, catalytic dewaxing, hydrotreating and clay treatment optionally in combination, and is excellent in electrical insulating properties, low moisture absorbing properties, hydrolysis resistance and viscosity index as compared with other mineral oils. Further, the paraffinic mineral oil has slightly low compatibility with the working fluid comprising the HCFO or the CFO, and is thereby capable of adjusting the compatibility of the naphthenic mineral oil with the HCFO or the CFO, and the viscosity in a state where the HCFO or the CFO and the refrigeration oil are compatible with each other (refrigerant dissolved viscosity) can be achieved.

The content of the paraffinic mineral oil in the mixed refrigeration oil is preferably from 10 to 50 mass %, more preferably from 20 to 40 mass % based on the entire amount of the refrigeration oil.

By the mixed refrigeration oil containing the paraffinic mineral oil in an amount of 50 mass % or lower, the compatibility between the working fluid and the mixed refrigeration oil can be maintained, and by the mixed refrigeration oil containing the paraffinic mineral oil in an amount of 10 mass % or higher, the viscosity properties of the refrigeration oil may be improved.

[Synthetic Oil Refrigeration Oil]

Further, as the synthetic refrigeration oil, as a representative example, an ester refrigeration oil, an ether refrigeration oil, a polyglycol refrigeration oil or a hydrocarbon refrigeration oil may, for example, be mentioned.

Among them, from the viewpoint of the compatibility with the HCFO or the CFO which is a working fluid component, preferred is an oxygen-containing synthetic refrigeration oil such as an ester refrigeration oil, an ether refrigeration oil or a polyglycol refrigeration oil, or a hydrocarbon refrigeration oil, more preferred is an ester refrigeration oil or an ether refrigeration oil, and particularly preferred is an ester refrigeration oil. Among them, a polyol ester refrigeration oil is most preferred.

Such a refrigeration oil may be used alone or in combination of two or more. Further, the kinematic viscosity of the synthetic refrigeration oil at 40° C. is preferably from 1 to 750 mm$^2$/s, more preferably from 1 to 400 mm$^2$/s in that the lubricity and the sealability of a compressor are not lowered, the lubricating machine oil is satisfactorily compatible with the working fluid under low temperature conditions, it is possible to prevent lubricity failure of a refrigeration compressor, and heat exchange in an evaporator can be sufficiently conducted. Further, the kinematic viscosity at 100° C. is preferably from 1 to 100 mm$^2$/s, more preferably from 1 to 50 mm$^2$/s, with a view to maintaining the electric power consumption and the abrasion resistance within proper ranges. And, one which satisfies the above predetermined viscosity properties after mixed with the naphthenic mineral oil is used.

Particularly in the case of an ester refrigeration oil or an ether refrigeration oil, as atoms constituting the refrigeration oil, carbon atoms and oxygen atoms are representatively mentioned. If the proportion (carbon/oxygen mole ratio) of carbon atoms to oxygen atoms is too low, moisture absorbing properties tend to be high, and if the proportion is too high, the compatibility with the working fluid will be decreased. From such a viewpoint, the proportion of carbon atoms to oxygen atoms in the refrigeration oil is suitably from 2 to 7.5 by the mole ratio.

Further, the hydrocarbon refrigeration oil is required to circulate in the heat cycle system together with the working fluid. The refrigeration oil is soluble with the working fluid in the most preferred embodiment, however, so long as a refrigeration oil which can circulate in the heat cycle system with the working fluid is selected, a refrigeration oil having low solubility (for example, a refrigeration oil as disclosed in Japanese Patent No. 2803451) may be used as one component of the composition for a heat cycle system in the present embodiment. In order that the refrigeration oil circulates in the heat cycle system, the refrigeration oil is required to have a low kinematic viscosity. In the present invention, the kinematic viscosity of the hydrocarbon refrigeration oil at 40° C. is preferably from 1 to 50 mm$^2$/s, particularly preferably from 1 to 25 mm²/s. One which satisfies the above predetermined viscosity properties after mixed with the naphthenic mineral oil is used.

<Ester Refrigeration Oil>

As the ester refrigeration oil, in view of chemical stability, a dibasic acid ester refrigeration oil of a dibasic acid and a monohydric alcohol, a polyol ester refrigeration oil of a polyol and a fatty acid, a complex ester refrigeration oil of a polyol, a polybasic acid and a monohydric alcohol (or a fatty acid), a polyol carbonate ester refrigeration oil or the like may be mentioned as the base oil component.

(Dibasic Acid Ester Refrigeration Oil)

The dibasic acid ester refrigeration oil is preferably an ester of a dibasic acid such as oxalic acid, malonic acid, succinic acid, glutaric acid, adipic acid, pimelic acid, suberic acid, azelaic acid, sebacic acid, phthalic acid, isophthalic acid or terephthalic acid, particularly a $C_{5-10}$ dibasic acid (such as glutaric acid, adipic acid, pimelic acid, suberic acid, azelaic acid or sebacic acid) with a $C_{1-15}$ monohydric alcohol which is linear or branched alkyl group (such as methanol, ethanol, propanol, butanol, pentanol, hexanol, heptanol, octanol, nonanol, decanol, undecanol, dodecanol, tridecanol, tetradecanol or pentadecanol). Such a dibasic acid ester refrigeration oil may, for example, be specifically ditridecyl glutarate, di(2-ethylhexyl) adipate, diisodecyl adipate, ditridecyl adipate or di(3-ethylhexyl) sebacate.

(Polyol Ester Refrigeration Oil)

The polyol ester refrigeration oil is an ester synthesized from a polyhydric alcohol and a fatty acid (a carboxylic acid), which has a carbon/oxygen mole ratio of 2 or higher and 7.5 or lower, preferably 3.2 or higher and 5.8 or lower.

The polyhydric alcohol constituting the polyol ester refrigeration oil may be a diol (such as ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol or 1,12-dodecanediol), a polyol having from 3 to 20 hydroxy groups (such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (a dimer or trimer of glycerin), 1,3,5-pentanetriol, sorbitol, sorbitan, a sorbitol/glycerin condensate, a polyhydric alcohol such as adonitol, arabitol, xylitol or mannitol, a saccharide such as xylose, arabinose, ribose, rhamnose, glucose, fructose, galactose, mannose, sorbose, cellobiose, maltose, isomaltose, trehalose, sucrose, raffinose, gentianose or melezitose, or a partially etherified product thereof), and the polyhydric alcohol constituting the ester may be used alone or in combination of two or more.

The number of carbon atoms in the fatty acid constituting the polyol ester refrigeration oil is not particularly limited, but usually a $C_{1-24}$ fatty acid is employed. A linear fatty acid or a branched fatty acid is preferred. The linear fatty acid may, for example, be acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid or linolenic acid, and the hydrocarbon group bonded to the carboxy group may be a totally saturated hydrocarbon or may have an unsaturated hydrocarbon. Further, the branched fatty acid may, for example, be 2-methylpropanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid or 2,2-diisopropylpropanoic acid. The ester may be an ester of one or more of such fatty acids.

The polyol constituting the ester may be used alone or as a mixture of two or more. Further, the fatty acid constituting the ester may be a single component or may be two or more types. Further, the fatty acid may be used alone or as a mixture of two or more. Further, the polyol ester refrigeration oil may have a free hydroxy group.

The specific polyol ester refrigeration oil is preferably an ester of a hindered alcohol such as neopentyl glycol, tirmethylolethane, trimethylolpropane, trimethylolbutane, di-(trimethylolpropane), tri-(trimethylolpropane), pentaerythritol, di-(pentaerythritol) or tri-(pentaerythritol), further preferably an ester of neopentyl glycol, trimethylolethane, trimethylolpropane, trimethylolbutane, pentaerythritol or di-(pentaerythritol), preferably an ester of e.g. neopentyl glycol, trimethylolpropane, pentaerythritol or di-(pentaerythritol) and a $C_{2-20}$ fatty acid.

The fatty acid constituting such a polyhydric alcohol fatty acid ester may consist solely of a fatty acid having a linear alkyl group, or may consist of a fatty acid having a branched structure. Otherwise, the fatty acid ester may be a mixed ester of linear and branched fatty acids. Further, two or more types selected from the above fatty acids may be used as the fatty acid constituting the ester.

As a specific example, in the case of a mixed ester of linear and branched fatty acids, the mole ratio of a $C_{4-6}$ linear fatty acid to a $C_{7-9}$ branched fatty acid is from 15:85 to 90:10, preferably from 15:85 to 85:15, more preferably from 20:80 to 80:20, further preferably from 25:75 to 75:25, most preferably from 30:70 to 70:30. Further, the total proportion of the $C_{4-6}$ linear fatty acid and the $C_{7-9}$ branched fatty acid based on the entire amount of the fatty acids constituting the polyhydric alcohol fatty acid ester is 20 mol % or higer. The fatty acid composition should be selected considering satisfying both sufficient compatibility with a working fluid and viscosity necessary as the refrigeration oil. The proportion of the fatty acid is a value based on the entire amount of the fatty acids constituting the polyhydric alcohol fatty acid ester contained in the refrigeration oil.

(Complex Ester Refrigeration Oil)

The complex ester refrigeration oil is an ester of a fatty acid and a dibasic acid, and a monohydric alcohol and a polyol. The fatty acid, the dibasic acid, the monohydric alcohol and the polyol may be the same as described above.

The fatty acid may be a fatty acid exemplified for the above polyol ester.

The dibasic acid may, for example, be oxalic acid, malonic acid, succinic acid, glutaric acid, adipic acid, pimelic acid, suberic acid, azelaic acid, sebacic acid, phthalic acid, isophthalic acid or terephthalic acid.

The polyol may be a polyol exemplified as the polyhydric alcohol for the above polyol ester. The complex ester is an ester of such a fatty acid, a dibasic acid and a polyol, and each compound may consist of a single component or several components.

(Polyol Carbonate Refrigeration Oil)

The polyol carbonate refrigeration oil is an ester of carbonic acid and a polyol.

The polyol may, for example, be a polyglycol (such as polyalkylene glycol, its ether compound or a modified compound thereof) obtained by homopolymerizing or copolymerizing a diol (as described above), a polyol (as described above), or one having a polyglycol added to a polyol.

The polyalkylene glycol may, for example, be one obtained by polymerizing a $C_{2-4}$ alkylene oxide (such as ethylene oxide or propylene oxide) using water or an alkali hydroxide as an initiator. Further, it may be one having a hydroxy group of a polyalkylene glycol etherified. One molecule of the polyalkylene glycol may contain single oxyalkylene units or two or more types of oxyalkylene units. It is preferred that at least oxypropylene units are contained in one molecule. Further, the polyol carbonate refrigeration oil may be a ring-opening polymer of a cyclic alkylene carbonate.

<Ether Refrigeration Oil>

The ether refrigeration oil may, for example, be a polyvinyl ether refrigeration oil or a polyalkylene glycol refrigeration oil.

(Polyvinyl Ether Refrigeration Oil)

The polyvinyl ether refrigeration oil may be one obtained by polymerizing a vinyl ether monomer, one obtained by copolymerizing a vinyl ether monomer and a hydrocarbon monomer having an olefinic double bond, or a copolymer of a polyvinyl ether and an alkylene glycol or a polyalkylene glycol or a monoether thereof.

The carbon/oxygen mole ratio of the polyvinyl ether refrigeration oil is 2 or higher and 7.5 or lower, preferably 2.5 or higher and 5.8 or lower. If the carbon/oxygen mole ratio is less than the above range, the moisture absorbing properties tend to be high, and if the mole ratio exceeds this range, the compatibility will decrease. Further, the weight average molecular weight of the polyvinyl ether is preferably 200 or higher and 300 or lower, more preferably 500 or higher and 1,500 or lower. The kinematic viscosity at 40° C. is preferably from 1 to 750 mm$^2$/s, more preferably from 1 to 400 mm$^2$/s. Further, the kinematic viscosity at 100° C. is preferably from 1 to 100 mm$^2$/s, more preferably from 1 to 50 mm$^2$/s. And, one which satisfies the above predetermined viscosity properties after mixed with the naphthenic mineral oil is used.

Structure of Polyvinyl Ether Refrigeration Oil

The vinyl ether monomer may be used alone or in combination of two or more. The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or various forms of alkyl-substituted styrene. The hydrocarbon monomer having an olefinic double bond may be used alone or in combination of two or more.

The polyvinyl ether copolymer may be either of a block copolymer and a random copolymer. The polyvinyl ether refrigeration oil may be used alone or in combination of two or more.

A polyvinyl ether refrigeration oil preferably used has structural units represented by the following formula (1).

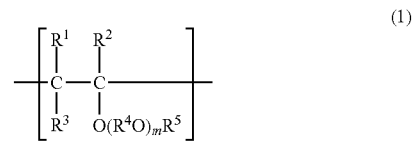

wherein $R^1$, $R^2$ and $R^3$ which may be the same or different, are a hydrogen atom or a $C_{1-8}$ hydrocarbon group, $R^4$ is a $C_{1-10}$ bivalent hydrocarbon group or a $C_{2-20}$ bivalent ether bond oxygen-containing hydrocarbon group, $R^5$ is a $C_{1-20}$ hydrocarbon group, m is a number such that the average value of m in the polyvinyl ether is from 0 to 10, $R^1$ to $R^5$ may be respectively the same or different from each other with respect to the respective structural units, and when m is 2 or higher in one structural unit, the plurality of $R^4O$ may be the same or different.

In the formula (1), it is preferred than at least one of $R^1$, $R^2$ and $R^3$ is a hydrogen atom, it is particularly preferred that all are a hydrogen atom. In the formula (1), m is preferably 0 or higher and 10 or lower, particularly preferably 0 or higher and 5 or lower, further preferably 0. In the formula (1), $R^5$ is a $C_{1-20}$ hydrocarbon group. The hydrocarbon group may, for example, be specifically an alkyl group such as a methyl group, an ethyl group, a n-propyl group, an isopropyl group, a n-butyl group, an isobutyl group, a sec-butyl group, a tert-butyl group, various forms of a pentyl group, various forms of a hexyl group, various forms of a heptyl group or various forms of an octyl group, a cycloalkyl group such as a cyclopentyl group, a cyclohexyl group, various forms of a methylcyclohexyl group, various forms of an ethylcyclohexyl group or various forms of a dimethylcyclohexyl group, an aryl group such as a phenyl group, various forms of a methylphenyl group, various forms of an ethylphenyl group or various forms of a dimethylphenyl group, or an arylalkyl group such as a benzyl group, various forms of a phenylethyl group or various forms of a methylbenzyl group, and is preferably an alkyl group, particularly preferably a $C_{1-5}$ alkyl group.

The polyvinyl ether refrigeration oil in the present embodiment may be a homopolymer in which the structural units represented by the formula (1) are the same, or may be a copolymer in which the structural units consist of two or more types. The copolymer may be either a block copolymer or a random copolymer.

The polyvinyl ether refrigeration oil in the present embodiment may be one constituted solely of structural units represented by the formula (1) or may be a copolymer further containing structural units represented by the following formula (2). In such a case, the copolymer may be either a block copolymer or a random copolymer.

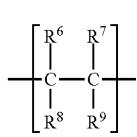

(2)

wherein $R^6$ to $R^9$ which may be the same or different, are a hydrogen atom or a $C_{1-20}$ hydrocarbon group.

(Polyvinyl Ether Monomer)

The vinyl ether monomer may, for example, be a compound of the following formula (3).

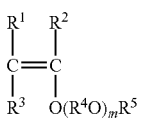

(3)

wherein $R^1$, $R^2$, $R^3$, $R^4$, $R^5$ and m are the same as $R^1$, $R^2$, $R^3$, $R^4$, $R^5$ and m in the formula (1).

As the vinyl ether monomer, various ones corresponding to the polyvinyl ether compounds may be mentioned, and for example, vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, vinyl-2-methoxy ethyl ether, vinyl-2-ethoxyethyl ether, vinyl-2-methoxy-1-methyl ethyl ether, vinyl-2-methoxy propyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, vinyl-2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene or 2-tert-butoxy-2-butene. Such a vinyl ether monomer may be prepared by a known method.

Terminal of Polyvinyl Ether

Of the polyvinyl ether compound having structural units represented by the formula (1) used as the refrigeration oil for the composition for a heat cycle system according to the present embodiment, the terminal may be converted to a desired structure by the method disclosed in Examples or by a known method. The terminal group may be converted to a saturated hydrocarbon, an ether, an alcohol, a ketone, an amide, a nitrile or the like.

The polyvinyl ether compound used as the refrigeration oil for the composition for a heat cycle system according to the present embodiment is preferably one having a terminal structure represented by any one of the following formulae (4) to (8).

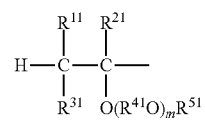

(4)

wherein $R^{11}$, $R^{21}$ and $R^{31}$ which may be the same or different, are a hydrogen atom or a $C_{1-8}$ hydrocarbon group, $R^{41}$ is a $C_{1-10}$ bivalent hydrocarbon group or a $C_{2-20}$ bivalent ether bond oxygen-containing hydrocarbon group, $R^{51}$ is a $C_{1-20}$ hydrocarbon group, and m is a number such that the average value of m in the polyvinyl ether is from 0 to 10, and when m is 2 or higher, a plurality of $R^{41}O$ may be the same or different.

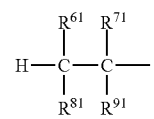

(5)

wherein $R^{61}$, $R^{71}$, $R^{81}$ and $R^{91}$ which may be the same or different, are a hydrogen atom or a $C_{1-20}$ hydrocarbon group.

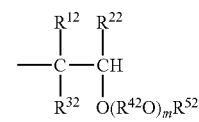

(6)

wherein $R^{12}$, $R^{22}$ and $R^{32}$ which may be the same or different, are a hydrogen atom or a $C_{1-8}$ hydrocarbon group, $R^{42}$ is a $C_{1-10}$ bivalent hydrocarbon group or a $C_{2-20}$ bivalent ether bond oxygen-containing hydrocarbon group, $R^{52}$ is a $C_{1-20}$ hydrocarbon group, m is a number such that the average value of m in the polyvinyl ether is from 0 to 10, and when m is 2 or higher, a plurality of $R^{42}O$ may be the same or different.

(7)

wherein $R^{62}$, $R^{72}$, $R^{82}$ and $R^{92}$ which may be the same or different, are a hydrogen atom or a $C_{1-20}$ hydrocarbon group.

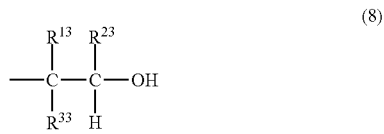
(8)

wherein $R^{13}$, $R^{23}$ and $R^{33}$ which may be the same or different, are a hydrogen atom or a $C_{1-8}$ hydrocarbon group.

(Method for Producing Polyvinyl Ether Refrigeration Oil)

The polyvinyl ether refrigeration oil according to the present embodiment may be produced by e.g. radical polymerization, cationic polymerization or radiation polymerization of the above monomer. After completion of the polymerization reaction, as the case requires, conventional separation or purification may be applied to obtain a desired polyvinyl ether compound having structural units represented by the formula (1).

(Polyalkylene Glycol Refrigeration Oil)

The polyalkylene glycol refrigeration oil may, for example, be one obtained by polymerizing a $C_{2-4}$ alkylene oxide (such as ethylene oxide or propylene oxide) using water or an alkali hydroxide as an initiator. Further, it may be one having a hydroxy group of a polyalkylene glycol etherified. One molecule of the polyalkylene glycol refrigeration oil may contain single oxyalkylene units or two or more types of oxyalkylene units. It is preferred that at least oxypropylene units are contained in one molecule.

A specific polyoxyalkylene glycol refrigeration oil may, for example, be a compound represented by the following formula (9):

$$R^{101}\text{—}[(OR^{102})_k\text{—}OR^{103}]_l \qquad (9)$$

wherein $R^{101}$ is a hydrogen atom, a $C_{1-10}$ alkyl group, a $C_{2-10}$ acyl group or a $C_{1-10}$ aliphatic hydrocarbon group having from 2 to 6 binding sites, $R^{102}$ is a $C_{2-4}$ alkylene group, $R^{103}$ is a hydrogen atom, a $C_{1-10}$ alkyl group or a $C_{2-10}$ acyl group, l is an integer of from 1 to 6, and k is a number which makes the average of k×l from 6 to 80.

In the above formula (9), the alkyl group as each of $R^{101}$ and $R^{103}$ may be linear, branched or cyclic. The alkyl group may, for example, be specifically a methyl group, an ethyl group, a n-propyl group, an isopropyl group, various forms of a butyl group, various forms of a pentyl group, various forms of a hexyl group, various forms of a heptyl group, various forms of an octyl group, various forms of a nonyl group, various forms of a decyl group, a cyclopentyl group or a cyclohexyl group. If the number of carbon atoms in the alkyl group exceeds 10, the compatibility with the working fluid will be decreased, thus leading to phase separation. The number of carbon atoms in the alkyl group is preferably from 1 to 6.

The alkyl group moiety in the acyl group as each of $R^{101}$ and $R^{103}$ may be linear, branched or cyclic. As specific examples of the alkyl group moiety in the acyl group, various $C_{1-9}$ groups mentioned as the specific examples of the alkyl group may be mentioned. If the number of carbon atoms in the acyl group exceeds 10, the compatibility with the working fluid will be decreased, thus leading to phase separation. The number of carbon atoms in the acyl group is preferably from 2 to 6.

In a case where both $R^{101}$ and $R^{103}$ are an alkyl group or an acyl group, $R^{101}$ and $R^{103}$ may be the same or different from each other.

Further, in a case where l is 2 or higher, the plurality of $R^{103}$ in one molecule may be the same or different from each other.

In a case where $R^{101}$ is a $C_{1-10}$ aliphatic hydrocarbon group having from 2 to 6 binding sites, the aliphatic hydrocarbon group may be chain-like or cyclic. The aliphatic hydrocarbon group having two binding sites may, for example, be an ethylene group, a propylene group, a butylene group, a pentylene group, a hexylene group, a heptylene group, an octylene group, a nonylene group, a decylene group, a cyclopentylene group or a cyclohexylene group. Further, an aliphatic hydrocarbon group having from 3 to 6 binding sites may, for example, be trimethylolpropane, glycerin, pentaerythritol, sorbitol; 1,2,3-trihydroxycyclohexane; or a residue having a hydroxy group removed from a polyhydric alcohol such as 1,3,5-trihydroxycyclohexane.

If the number of carbon atoms in the aliphatic hydrocarbon group exceeds 10, the compatibility with the working fluid will be decreased, thus leading to a phase separation. The number of carbon atoms is preferably form 2 to 6.

$R^{102}$ in the above formula (9) is a $C_{2-4}$ alkylene group, and the oxyalkylene group as a repeating unit may be an oxyethylene group, an oxypropylene group or an oxybutylene group. One molecule of the compound of the formula (9) may contain single type of oxyalkylene groups or two or more types of oxyalkylene groups. It is preferred that at least oxypropylene units are contained in one molecule, and it is particularly preferred that 50 mol % or higher of oxypropylene units are contained in oxyalkylene units.

In the above formula (9), l is an integer of from 1 to 6 and is defined depending upon the number of the binding sites of $R^{101}$. For example, in a case where $R^{101}$ is an alkyl group or an acyl group, l is 1, and in a case where $R^{101}$ is an aliphatic hydrocarbon group having 2, 3, 4, 5 or 6 binding sites, l is 2, 3, 4, 5 or 6, respectively. Further, k is a number which makes the average of k×l from 6 to 80, and if the average of k×l is out of the above range, the objects of the present embodiment will not sufficiently be accomplished.

The structure of the polyalkylene glycol is suitably polypropylene glycol dimethyl ether represented by the following formula (10) or polyethylene polypropylene glycol dimethyl ether represented by the following formula (11) in view of economical efficiency and the above-described effects, and is more suitably polypropylene glycol monobutyl ether represented by the following formula (12), further suitably polypropylene glycol monomethyl ether represented by the following formula (13), polyethylene polypropylene glycol monomethyl ether represented by the following formula (14), polyethylene polypropylene glycol monobutyl ether represented by the following formula (15) or polypropylene glycol diacetate represented by the following formula (16) in view of economical efficiency, etc.

$$CH_3O\text{—}(C_3H_6O)_h\text{—}CH_3 \qquad (10)$$

(wherein h is a number of from 6 to 80)

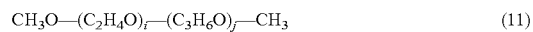
$$CH_3O\text{—}(C_2H_4O)_i\text{—}(C_3H_6O)_j\text{—}CH_3 \qquad (11)$$

(wherein each of i and j is a number of 1 or higher, provided that the sum of i and j is from 6 to 80)

$$C_4H_9O\text{—}(C_3H_6O)_h\text{—}H \quad (12)$$

(wherein h is a number of from 6 to 80)

$$CH_3O\text{—}(C_3H_6O)_h\text{—}H \quad (13)$$

(wherein h is a number of from 6 to 80)

$$CH_3O\text{—}(C_2H_4O)_i\text{—}(C_3H_6O)_j\text{—}H \quad (14)$$

(wherein each of i and j is a number of 1 or higher, provided that the sum of i and j is from 6 to 80)

$$C_4H_9O\text{—}(C_2H_4O)_i\text{—}(C_3H_6O)_j\text{—}H \quad (15)$$

(wherein each of i and j is a number of 1 or higher, provided that the sum of i and j is from 6 to 80)

$$CH_3COO\text{—}(C_3H_6O)_h\text{—}COCH_3 \quad (16)$$

(wherein h is a number of from 6 to 80)

Such polyoxyalkylene glycols may be used alone or in combination of two or more.

The kinematic viscosity of the polyalkylene glycol represented by the formula (9) at 40° C. is preferably from 1 to 750 mm²/s, more preferably from 1 to 400 mm²/s. Further, the kinematic viscosity at 100° C. is preferably from 1 to 100 mm²/s, more preferably from 1 to 50 mm²/s. One which satisfies the above predetermined viscosity properties after mixed with the naphthenic mineral oil is used.

<Hydrocarbon Synthetic Refrigeration Oil>

As the hydrocarbon synthetic refrigeration oil, an alkylbenzene may be used.

As the alkylbenzene, a branched alkylbenzene prepared from a polymer of propylene and benzene as raw materials using a catalyst such as hydrogen fluoride, or a linear alkylbenzene prepared from n-paraffin and benzene as raw materials using such a catalyst may be used. The number of carbon atoms in the alkyl group is preferably from 1 to 30, more preferably from 4 to 20, with a view to obtaining a viscosity suitable as a lubricating base oil. Further, the number of the alkyl group in one molecule of the alkylbenzene is preferably from 1 to 4, more preferably from 1 to 3, in order that the viscosity is within the set range, although it depends on the number of carbon atoms in the alkyl group.

Further, as the hydrocarbon synthetic refrigeration oil, an olefin polymer may also be used.

As the olefin polymer, for example, a polyalphaolefin which is a polymer of decene, dodecene or the like may be mentioned, and such a polyalphaolefin has a high viscosity index and low temperature fluidity.

Further, the refrigeration oil is required to circulate in the heat cycle system together with the working fluid. The refrigeration oil is soluble with the working fluid in the most preferred embodiment, however, so long as a refrigeration oil which can circulate in the heat cycle system with the working fluid is selected, a refrigeration oil having low solubility may be used for the refrigeration oil composition of the present embodiment. In order that the refrigeration oil circulates in the heat cycle system, the refrigeration oil is required to have a low kinematic viscosity. In the present invention, the kinematic viscosity of the alkylbenzene at 40° C. is preferably from 1 to 100 mm²/s, particularly preferably from 1 to 50 mm²/s. One which satisfied the above predetermined viscosity properties after mixed with the naphthenic mineral oil is used.

Such a refrigeration oil may be used alone or in combination of two or more.

The mixed refrigeration oil used in the present invention is a mixed refrigeration oil obtained by mixing a naphthenic mineral oil and at least one refrigeration oil selected from a paraffinic mineral oil, an alkylbenzene, an olefin polymer, a polyol ester refrigeration oil, a polyvinyl ether refrigeration oil and a polyalkylene glycol refrigeration oil, particularly preferably a mixed refrigeration oil obtained by mixing a naphthenic mineral oil and at least one member selected from a paraffinic mineral oil, an olefin polymer and a polyol ester refrigeration oil. By using such a mixed refrigeration oil, a composition for heat cycle more excellent in stability and lubricity can be obtained.

The mixed refrigeration oil used in the present invention contains a naphthenic mineral oil in an amount of from 50 to 90 mass % in the mixed refrigeration oil, whereby a composition for heat cycle more excellent in stability and lubricity can be obtained.

Further, the mixed refrigeration oil may contain an additive which is commonly added to a refrigeration oil (an antioxidant, an antifoaming agent, a heat resistance-improving agent, a metal deactivator, an oiliness agent or an abrasion resistance-improving agent). The content of such an additive is within a range not to remarkably decrease the effects of the present embodiment, and is usually 5 mass % or lower, preferably 3 mass % or lower in the composition for a heat cycle system (100 mass %).

In the composition for a heat cycle system, the content of the mixed refrigeration oil is within a range not to remarkably decrease the effects of the present embodiment, and is preferably from 10 to 100 parts by mass, more preferably from 20 to 50 parts by mass per 100 parts by mass of the working fluid.

<Other Optional Component>

The composition for a heat cycle system may contain a known optional component in addition within a range not to impair the effects of the present invention. Such an optional component may, for example, be a leak detecting substance, and such a leak detecting substance optionally contained may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The content of the leak detecting substance in the composition for a heat cycle system is not particularly limited within a range not to remarkably decrease the effects of the present embodiment, and is preferably 2 parts or lower by the mass, more preferably 0.5 part or lower by the mass per 100 parts by the mass of the working fluid.

[Heat Cycle System]

The heat cycle system according to the present embodiment is a system employing the composition for a heat cycle system according to the present embodiment. The heat cycle system may be a heat pump system utilizing heat obtained by a condenser or may be a refrigerating cycle system utilizing coldness obtained by an evaporator.

The heat cycle system according to the present embodiment may, for example, be specifically a refrigeration equipment, an air-conditioning equipment, a power generation system, a heat transfer apparatus and a secondary cooling machine. Among them, the heat cycle system according to the present embodiment, which efficiently exhibits heat cycle performance in a working environment at higher temperature, is preferably employed as an air-conditioning apparatus to be disposed outdoors in many cases. Further, the heat cycle system according to the present embodiment is preferably employed also for a refrigeration equipment.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system according to the present embodiment may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

The refrigeration equipment may, for example, be specifically a showcase (such as a built-in showcase or a separate showcase), a commercial refrigerator-freezer, a vending machine or an ice making machine.

The air-conditioning apparatus may, for example, be specifically a room air-conditioner, a packaged air-conditioner (such as a store packaged air-conditioner, a building packaged air-conditioner or a plant packaged air-conditioner), a heat source apparatus chilling unit, a gas engine heat pump, a train air-conditioning system or an automobile air-conditioning system.

As the heat source apparatus chilling unit, for example, a volume compression refrigerator or a centrifugal refrigerator may be mentioned. The centrifugal refrigerator described below is preferred since the working fluid filling amount is large, whereby the effects of the present embodiment can be more remarkably obtained.

The centrifugal refrigerator is a refrigerator which employs a centrifugal compressor. The centrifugal refrigerator is one type of a vapor compression refrigerator, and usually, also called a turbo refrigerator. The centrifugal compressor is provided with an impeller and discharges the working fluid to the periphery by the rotating impeller to conduct compression. The centrifugal refrigerator is used for heating and cooling in office buildings, district heating and cooling and in hospitals and in addition, cold water production plants in semiconductor plants and in petrochemical industry, etc.

The centrifugal refrigerator may be either low pressure type or high pressure type, and is preferably a low pressure type centrifugal refrigerator. Here, a low pressure type means a centrifugal refrigerator employing a working fluid which is not subject to High Pressure Gas Safety Act, such as CFC-11, HCFC-123 or HFC-245fa, that is, a working fluid which does not correspond to "a liquified gas of which the gas pressure is 0.2 MPa or greater at the normal operating temperature and the gas pressure is 0.2 MPa or greater at present, or a liquified gas of which the temperature for the gas pressure to reach 0.2 MPa is 35° C. or below".

Now, as an example of the heat cycle system according the present embodiment, a refrigerating cycle system will be described with reference to a refrigerating cycle system 10 which has been roughly described above, of which the schematic construction view is shown in FIG. 1, as an example. A refrigerating cycle system is a system utilizing coldness obtained by an evaporator.

A refrigerating cycle system 10 shown in FIG. 1 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated and becomes a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure enthalpy chart (curve) as shown in FIG. 2, may be represented as a trapezoid having points A, B, C and D as vertexes.

Figure 2:
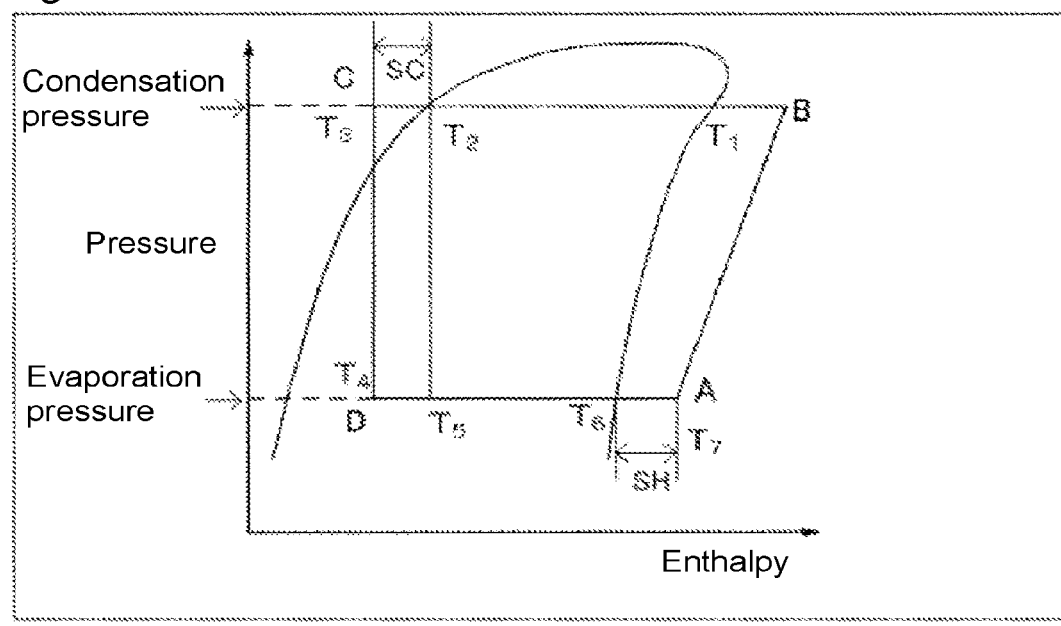
FIG. 2 is a cycle diagram illustrating the state change of a working fluid in the refrigeration cycle system in FIG. 1 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 2.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure enthalpy chart and the BC line, the intersection point $T_1$ on the high enthalpy side is the condensing temperature, and the intersection point $T_2$ on the low enthalpy side is the condensation boiling point temperature. Here, in the case of a mixed fluid of HCFO-1224yd with other working fluid which is a non-azeotropic mixture fluid, the temperature glide is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D return to a high temperature/low pressure working fluid vapor A, and is represented by the DA line in FIG. 2. The pressure in this process is the evaporation pressure. Of the two intersection points of the pressure enthalpy chart and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (A) and (B) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid:

$$Q=h_A-h_D \tag{A}$$

$$COP=Q/\text{compression work}=(h_A-h_D)/(h_B-h_A) \tag{B}$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

In the heat cycle system employing the composition for a heat cycle system according to the present embodiment, for example, in a refrigerating cycle system 10 shown in FIG. 1, as compared with a case where HFC-134a which has been commonly used for an air-conditioning apparatus or the like is used, it is possible to achieve high levels of Q and COP, i.e. equal to or higher than those of HFC-134a, while remarkably suppressing the global worming potential.

Further, since the working fluid contained in the composition for a heat cycle system to be employed may have a composition with which the temperature glide of the working fluid is suppressed to a certain level or lower, and in such a case, the composition change when the composition for a heat cycle system is put into a refrigeration and an air-conditioning equipment from a pressure container and a change in the composition of the working fluid in a refrigeration and an air-conditioning equipment when the working fluid leaks out from the refrigeration and the air-conditioning equipment, can be suppressed to lower levels. Further, according to the composition for a heat cycle system according to the present embodiment, the lubricating properties of the working fluid contained in the composition are improved, and accordingly a heat cycle system employing the composition can maintain a more efficient circulation state of the working fluid as compared with a conventional system, and can be stably operated.

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigeration oil, deterioration of materials by an acid component formed in the cycle, formation of contaminants, etc. may arise. Particularly, if the refrigeration oil is a polyglycol refrigeration oil or a polyol ester refrigeration oil, it has extremely high moisture absorbing properties and is likely to undergo hydrolysis, and inclusion of moisture decreases properties of the refrigeration oil and may be a great cause to impair the long term reliability of a compressor. Accordingly, in order to suppress hydrolysis of the refrigeration oil, it is necessary to control the moisture concentration in the heat cycle system.

As a method of controlling the moisture concentration in the heat cycle system, a method of using a moisture-removing means such as a desiccant (such as silica gel, activated aluminum or zeolite) may be mentioned. The desiccant is preferably brought into contact with the composition for a heat cycle system in a liquid state, in view of the dehydration efficiency. For example, the desiccant is located at the outlet of the condenser 12 or at the inlet of the evaporator 14 to be brought into contact with the composition for a heat cycle system.

The desiccant is preferably a zeolite desiccant in view of chemical reactivity of the desiccant and the composition for a heat cycle system, and the moisture absorption capacity of the desiccant.

The zeolite desiccant is, in a case where a refrigeration oil having a large moisture absorption as compared with a conventional mineral refrigeration oil is used, preferably a zeolite desiccant containing a compound represented by the following formula (C) as the main component in view of excellent moisture absorption capacity.

$$M_{2/n}O \cdot Al_2O_3 \cdot xSiO_2 \cdot yH_2O \tag{C}$$

wherein M is a group 1 element such as Na or K or a group 2 element such as Ca, n is the valence of M, and x and y are values determined by the crystal structure. The pore size can be adjusted by changing M.

To select the desiccant, the pore size and the fracture strength are important.

In a case where a desiccant having a pore size larger than the molecular size of the working fluid and the refrigeration oil contained in the composition for a heat cycle system is used, the working fluid and the refrigeration oil is adsorbed in the desiccant and as a result, chemical reaction of the working fluid and the refrigeration oil with the desiccant will occur, thus leading to undesired phenomena such as formation of non-condensing gas, a decrease in the strength of the desiccant, and a decrease in the adsorption capacity.

Accordingly, it is preferred to use as the desiccant a zeolite desiccant having a small pore size. Particularly preferred is sodium/potassium type A synthetic zeolite having a pore size of at most 3.5 Å. By using a sodium/potassium type A synthetic zeolite having a pore size smaller than the molecular size of the working fluid and the refrigeration oil, it is possible to selectively adsorb and remove only moisture in the heat cycle system without adsorbing the working fluid and the refrigeration oil. In other words, the working fluid and the refrigeration oil are less likely to be adsorbed in the desiccant, whereby heat decomposition is less likely to occur and as a result, deterioration of materials constituting the heat cycle system and formation of contaminants can be suppressed.

The size of the zeolite desiccant is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccant may be formed into an optional shape by solidifying powdery zeolite by a binder (such as bentonite). So long as the desiccant is composed mainly of the zeolite desiccant, other desiccant (such as silica gel or activated alumina) may be used in combination.

The proportion of the zeolite desiccant based on the composition for a heat cycle system is not particularly limited.

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the refrigeration oil and promotes their decomposition.

The non-condensing gas concentration is preferably 1.5 vol % or lower, particularly preferably 0.5 vol % or lower by the volume ratio based on the working fluid, in a gaseous phase of the working fluid.

According to the above-described heat cycle system according to the present embodiment, which employs the composition for a heat cycle system of the present embodiment, favorable lubricating properties are achieved and thus high heat cycle performance can be obtained, and excellent stability is obtained, while suppressing influence over global warming.

EXAMPLES

Now, the present invention will be described in further detail with reference to Examples of the present invention and Comparative Examples.

The following working fluids and refrigeration oils were used.

[Working Fluid]
Working fluid 1: HCFO-1224yd (HCFO-1224yd (E): HCFO-1224yd (Z)=15:85 (mass ratio))
[Refrigeration Oil]
As the refrigeration oil constituting the mixed refrigeration oil (base oil), the following have been used. Properties of such refrigeration oils are shown in Table 2.

Refrigeration oil A: naphthenic mineral oil (tradename: SUNISO 5GS, manufactured by JAPAN SUN OIL COMPANY, LTD., VG100)
Refrigeration oil B: naphthenic mineral oil (tradename: SUNISO 6GS, manufactured by JAPAN SUN OIL COMPANY, LTD., VG150)
Refrigeration oil C: paraffinic mineral oil (VG100)
Refrigeration oil D: polyalphaolefin oil (VG46)
Refrigeration oil E: polyalphaolefin oil (VG600)
Refrigeration oil F: branched polyol ester oil comprising pentaerythritol, 2-ethylhexanoic acid and 3,5,5-trimethylhexanoic acid (VG68)
Refrigeration oil G: branched polyol ester oil comprising dipentaerythritol, 2-ethylhexanoic acid and 3,5,5-trimethylhexanoic acid (VG230)
Refrigeration oil H: linear polyol ester oil comprising trimethylolpropane and n-nonanoic acid (VG22)
Refrigeration oil I: polyalkylene glycol oil (VG46)
Refrigeration oil J: polyalkylene glycol oil (VG68)
Refrigeration oil K: polyvinyl ether oil (VG50)

TABLE 2

|  | Unit | Refrigeration oil A | Refrigeration oil B | Refrigeration oil C (Viscosity grade) | Refrigeration oil D | Refrigeration oil E |
|---|---|---|---|---|---|---|
|  |  | Naphthenic oil (VG100) | Naphthenic oil (VG150) | Paraffinic oil (VG100) | Polyalphaolefin (VG46) | Polyalphaolefin (VG600) |
| Density (15° C.) | g/cm$^3$ | 0.917 | 0.932 | 0.869 | 0.833 | 0.844 |
| Color (ASTM color) |  | L1.0 | L1.5 | L0.5 | L0.5 | L0.5 |
| Kinematic viscosity (40° C.) | mm$^2$/s | 97.5 | 142 | 90.2 | 46.4 | 602 |
| Kinematic viscosity (100° C.) | mm$^2$/s | 8.56 | 10.1 | 10.3 | 7.8 | 65 |
| Viscosity index |  | 33 | 13 | 104 | 137 | 183 |
| Total acid number | mgKOH/g | 0.01 | 0.01 | 0.01 | 0.01 | 0.02 |
| Pour point | ° C. | −30 | −25 | −10 | −56 | −42 |
| Aniline point | ° C. | 86 | 83 | — | — | — |

TABLE 3

|  | Unit | Refrigeration oil F | Refrigeration oil G | Refrigeration oil H | Refrigeration oil I | Refrigeration oil J | Refrigeration oil K |
|---|---|---|---|---|---|---|---|
|  |  | (Viscosity grade) | | | | | |
|  |  | Branch-POE (VG68) | Branch-POE (VG230) | Linear-POE (VG22) | Double Caped-PAG (VG46) | Single Caped-PAG (VG68) | PVE (VG50) |
| Density (15° C.) | g/cm³ | 0.959 | 0.9732 | 0.945 | 1.013 | 1.008 | 0.932 |
| Color (ASTM color) |  | L0.5 | L0.5 | L0.5 | L0.5 | L0.5 | L0.5 |
| Kinematic viscosity (40° C.) | mm²/s | 66.6 | 215 | 20.7 | 46.6 | 73.1 | 50.7 |
| Kinematic viscosity (100° C.) | mm²/s | 8.22 | 18.5 | 4.6 | 9.07 | 10.7 | 6.79 |
| Viscosity index |  | 90 | 96 | 143 | 180 | 133 | 84 |
| Total acid number | mgKOH/g | 0.01 | 0.01 | 0.01 | 0.01 | 0.01 | 0.01 |
| Pour point | ° C. | −40 | −30 | <−50 | −40 | −40 | −40 |

(Ex. 1 to 17)

Using the working fluid 1 and the refrigeration oils A to K, 50 g of the working fluid and 50 g of the mixed refrigeration oil (base oil) were mixed and dissolved to produce a composition for a heat cycle system. That is, the compositions for a heat cycle system in these Examples are ones comprising 50 mass % of the working fluid and 50 mass % of the mixed refrigeration oil (base oil). In these Ex., the refrigeration oils were mixed in a predetermined proportion so as to achieve the compositions as identified in Table 4 to 6 to obtain mixed refrigeration oils (base oils). Ex. 1 to 6 are Examples of the present invention, and Ex. 7 to 17 are Comparative Examples.

With respect to the obtained composition for a heat cycle system, the kinematic viscosity of the mixed refrigeration oil, the two phase separation temperature and the refrigerant dissolved viscosity of mixtures of the heat cycle working fluid and the mixed refrigeration oil at specific ratios, and thermochemical stability of the composition for a heat cycle system were measured, and the results are shown in Tables 4 to 6.

TABLE 4

|  | Ex. 1 | Ex. 2 | Ex. 3 | Ex. 4 | Ex. 5 | Ex. 6 |
|---|---|---|---|---|---|---|
| Base oil composition | Refrigeration oil A 70% | Refrigeration oil A 50% | Refrigeration oil A 90% | Refrigeration oil A 80% | Refrigeration oil B 90% | Refrigeration oil A 40% |
|  | Refrigeration oil C 30% | Refrigeration oil C 40% | Refrigeration oil E 5% | Refrigeration oil C 10% | Refrigeration oil F 10% | Refrigeration oil C 40% |
|  | — | Refrigeration oil F 10% | Refrigeration oil G 5% | Refrigeration oil G 10% | — | Refrigeration oil F 20% |
| Kinematic viscosity (mm²/s) | 92.1 | 84.3 | 106 | 112 | 123 | 78.4 |
| Low temperature side two phase separation temperature (° C.) Oil concentration: 5% | −11 | −12 | −22 | −21 | −20 | 0 |
| Refrigerant dissolved viscosity (mPa · s) 60° C.-refrigerant concentration: 10% | 10.8 | 10.9 | 11.1 | 10.7 | 13.7 | 11.0 |
| Thermochemical stability (175° C.) | Good | Good | Good | Good | Good | Good |

TABLE 5

|  | Ex. 7 | Ex. 8 | Ex. 9 | Ex. 10 | Ex. 11 | Ex. 12 |
|---|---|---|---|---|---|---|
| Base oil composition | Refrigeration oil A 80% | Refrigeration oil A 80% | Refrigeration oil B 70% | Refrigeration oil C 90% | Refrigeration oil E 50% | Refrigeration oil E 50% |
|  | Refrigeration oil D 20% | Refrigeration oil E 15% | Refrigeration oil E 20% | Refrigeration oil H 10% | Refrigeration oil G 50% | Refrigeration oil H 50% |
|  | — | Refrigeration oil G 5% | Refrigeration oil G 10% | — | — | — |

TABLE 5-continued

|  | Ex. 7 | Ex. 8 | Ex. 9 | Ex. 10 | Ex. 11 | Ex. 12 |
|---|---|---|---|---|---|---|
| Kinematic viscosity (mm²/s) | 76 | 146 | 171 | 72.6 | 384 | 95.7 |
| Low temperature side two phase separation temperature (° C.) Oil concentration: 5% | −20 | +25 | +34 | +12 | +48 | +42 |
| Refrigerant dissolved viscosity (mPa · s) 60° C.-refrigerant concentration: 10% | 9.4 | 13.5 | 20.7 | 12.0 | 41.0 | 17.9 |
| Thermochemical stability (175° C.) | Good | Good | Good | Good | Good | Good |

TABLE 6

|  | Ex. 13 | Ex. 14 | Ex. 15 | Ex. 16 | Ex. 17 |
|---|---|---|---|---|---|
| Base oil composition | Refrigeration oil A 100% | Refrigeration oil F 100% | Refrigeration oil I 100% | Refrigeration oil J 100% | Refrigeration oil K 100% |
|  | — | — | — | — | — |
| Kinematic viscosity (mm²/s) | 97.5 | 66.6 | 46.6 | 73.2 | 50.7 |
| Low temperature side two phase separation temperature (° C.) Oil concentration: 5% | −24 | <−50 | <−50 | <−50 | <−50 |
| Refrigerant dissolved viscosity (mPa · s) 60° C.-refrigerant concentration: 10% | 9.9 | 7.8 | 7.6 | 9.4 | 8.2 |
| Thermochemical stability (175° C.) | Good | Good | Poor | Poor | Poor |

(Kinematic Viscosity)

The kinematic viscosity of the mixed refrigeration oil was measured in accordance with JIS K2283.

(Two Phase Separation Temperature)

The two phase separation temperature of a mixture (mixed composition 2) obtained by adding the mixed refrigeration oil to the working fluid 1 at a concentration of the mixed refrigeration oil of 5 mass % was measured in accordance with JIS K2211.

(Refrigerant Dissolved Viscosity)

A required amount of a refrigeration oil was enclosed in a pressure container provided with a stirring apparatus, a pressure gauge and a piston viscometer, the container was evacuated of air, and then a required amount of the working fluid (refrigerant) was introduced, the working fluid and the refrigeration oil were uniformly mixed with stirring at the measurement temperature, and in such a state, the viscosity at 60° C. was measured by the viscometer. The mixture used here is a mixture (mixed composition 1) obtained by adding the working fluid 1 to the mixed refrigeration oil at a concentration of the working fluid 1 of 10 mass %. The solubility of the working fluid and the refrigeration oil in the container was calculated from the value indicated by the pressure gauge provided to the container, with separate measurement of the relation between the pressure and the solubility of the refrigeration oil and the working fluid.

(Thermochemical Stability)

The thermochemical stability of the composition for a heat cycle system was measured in accordance with ASHRAE 97 Sealed Glass Tube Method.

From the above results, it was confirmed that the composition for a heat cycle system obtained by mixing a predetermined mixed refrigeration oil with a predetermined working fluid for heat cycle according to the present embodiment, kept advantages of the working fluid for heat cycle such that influence over global warming is suppressed and high cycle performance is obtained, and further achieved favorable lubricity and stability, and was thereby confirmed to be an excellent composition for a heat cycle system.

INDUSTRIAL APPLICABILITY

The composition for a heat cycle system and the heat cycle system employing the composition according to the present embodiment are useful for a refrigeration equipment (such as a built-in showcase, a separate showcase, a commercial refrigerator-freezer, a vending machine or an ice making machine), an air-conditioning apparatus (such as a room air-conditioner, a store packaged air-conditioner, a building packaged air-conditioner, a plant packaged air-conditioner, a heat source apparatus chilling unit, a gas engine heat pump, a train air-conditioning system or an automobile air-conditioning system), power generation system (such as exhaust heat recovery power generation) or a heat transport apparatus (such as a heat pipe).

REFERENCE SYMBOLS

10: Refrigerating cycle system, 11: compressor, 12: condenser, 13: expansion valve, 14: evaporator, 15, 16: pump

What is claimed is:
1. A composition for a heat cycle system, comprising:
a working fluid for heat cycle containing at least one compound selected from a hydrochlorofluoroolefin and a chlorofluoroolefin represented by the following formula (a), and
a mixed refrigeration oil containing a naphthenic mineral oil and at least one refrigeration oil selected from a paraffinic mineral oil, an alkylbenzene, an olefin poly- mer, a polyol ester refrigeration oil, a polyvinyl ether refrigeration oil and a polyalkylene glycol refrigeration oil, wherein the mixed refrigeration oil has a kinematic viscosity at 40° C. of 300 mm²/sec or lower, a mixture (mixed composition 1) of the working fluid for heat cycle and the mixed refrigeration oil at a concentration of the working fluid for heat cycle of 10 mass % has a viscosity at 60° C. of 10.5 mPa·s or higher, and a mixture (mixed composition 2) of the working fluid for heat cycle and the mixed refrigeration oil at a concentration of the mixed refrigeration oil of 5 mass % has a two phase separation temperature of 0° C. or lower:

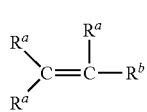 (a)

wherein $R^a$ is each independently a fluorine atom, a chlorine atom or a hydrogen atom, $R^b$ is $(CR^a{}_2)_n Y$, Y is $CF_3$, n is 0 or 1, and at least one $R^a$ is a chlorine atom, and at least one $R^a$ is a fluorine atom.

2. The composition for a heat cycle system according to claim 1, wherein the mixed refrigeration oil contains a naphthenic mineral oil and at least one member selected from a paraffinic mineral oil, an olefin polymer and a polyol ester refrigeration oil.

3. The composition for a heat cycle system according to claim 1, wherein the content of the working fluid for heat cycle is from 40 to 95 mass % based on the entire amount of the composition for a heat cycle system.

4. The composition for a heat cycle system according to claim 1, wherein the content of the mixed refrigeration oil is from 5 to 60 mass % based on the entire amount of the composition for a heat cycle system.

5. The composition for a heat cycle system according to claim 1, wherein the content of the naphthenic mineral oil is from 50 to 90 mass % based on the entire amount of the mixed refrigeration oil.

6. The composition for a heat cycle system according to claim 1, wherein the working fluid for heat cycle contains 1-chloro-2,3,3,3-tetrafluoropropene.

7. The composition for a heat cycle system according to claim 6, wherein in the 1-chloro-2,3,3,3-tetrafluoropropene, the ratio of (Z)-1-chloro-2,3,3,3-tetrafluoropropene to (E)-1-chloro-2,3,3,3-tetrafluoropropene is, by the mass ratio represented by (Z)-1-chloro-2,3,3,3-tetrafluoropropene:(E)-1-chloro-2,3,3,3-tetrafluoropropene, from 51:49 to 100:0.

8. The composition for a heat cycle system according to claim 6, wherein the content of 1-chloro-2,3,3,3-tetrafluoropropene is 10 mass % or higher per 100 mass % of the working fluid for heat cycle.

9. The composition for a heat cycle system according to claim 6, wherein the content of 1-chloro-2,3,3,3-tetrafluoropropene is from 20 to 95 mass % per 100 mass % of the working fluid for heat cycle.

10. A heat cycle system, which employs the composition for a heat cycle system as defined in claim 1.

11. The heat cycle system according to claim 10, which is a refrigerating apparatus, an air-conditioning apparatus, a power generation system, a heat transport apparatus or a secondary cooling machine.

12. The heat cycle system according to claim 10, which is a centrifugal refrigerator.

13. The heat cycle system according to claim 10, which is a low pressure centrifugal refrigerator.

* * * * *